United States Patent
Konchan et al.

(10) Patent No.: US 9,766,629 B1
(45) Date of Patent: Sep. 19, 2017

(54) AUTONOMOUS PULSE AND GLIDE SYSTEM

(71) Applicant: Ford Global Technologies, LLC, Dearborn, MI (US)

(72) Inventors: Zachary Konchan, Westland, MI (US); Hans Gangwar, Livonia, MI (US); Dale Scott Crombez, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/262,281

(22) Filed: Sep. 12, 2016

(51) Int. Cl.
| | | |
|---|---|---|
| *G05D 1/02* | (2006.01) | |
| *B60W 30/165* | (2012.01) | |
| *B60R 16/023* | (2006.01) | |
| *B60W 30/18* | (2012.01) | |

(52) U.S. Cl.
CPC ....... *G05D 1/0287* (2013.01); *B60R 16/0236* (2013.01); *B60W 30/165* (2013.01); *B60W 30/18009* (2013.01); *G05D 1/0257* (2013.01)

(58) Field of Classification Search
CPC .......... G08G 1/20; G08G 1/22; G05D 1/0287; G05D 1/0257; B60R 16/0236; B60W 30/165; B60W 30/18009
USPC .......................................................... 701/23
See application file for complete search history.

(56) References Cited

U.S. PATENT DOCUMENTS

| | | | | |
|---|---|---|---|---|
| 6,763,292 B1* | 7/2004 | Smith | ................... | B60G 17/015 701/1 |
| 8,340,884 B1* | 12/2012 | He | .................. | B60W 30/18072 340/439 |
| 8,639,430 B2 | 1/2014 | Yu et al. | | |
| 8,768,584 B2 | 7/2014 | Dufford | | |
| 8,825,339 B2 | 9/2014 | Shono et al. | | |
| 8,831,813 B1 | 9/2014 | Ferguson et al. | | |
| 8,948,969 B2 | 2/2015 | Hrovat et al. | | |
| 9,182,764 B1* | 11/2015 | Kolhouse | ............... | G08G 1/017 |
| 9,187,117 B2 | 11/2015 | Spero et al. | | |
| 2010/0256852 A1* | 10/2010 | Mudalige | ............... | G08G 1/163 701/24 |
| 2011/0054768 A1 | 3/2011 | Sullivan | | |
| 2013/0226420 A1* | 8/2013 | Pedlar | .................. | B60K 31/047 701/67 |
| 2014/0195116 A1* | 7/2014 | Hrovat | .................. | B60W 10/06 701/38 |
| 2014/0244129 A1* | 8/2014 | Filev | ...................... | B60K 31/00 701/93 |

(Continued)

OTHER PUBLICATIONS

Li, Shengbo Eben, "Effect of Pulse-and-Gllide Strategy on Traffic Flow for a Platoon of Mixed Automated and Manually Driven Vehicles," Computer-Aided Civil and Infrastructure Engineering, 2015, 14 pages.

*Primary Examiner* — Tyler J Lee
(74) *Attorney, Agent, or Firm* — Frank MacKenzie; Bejin Bieneman PLC (57) ABSTRACT

An autonomous pulse and glide system and method are disclosed. Pulse and glide is a fuel savings strategy that pulses a host vehicle to a maximum target speed and glides to a minimum target speed. Where the host vehicle detects that a lead vehicle is within a minimum distance the pulse and glide strategy is modified. The system may interrupt a pulse or may instruct the host vehicle to pass the lead vehicle. The host vehicle may also include an inter-vehicle communication module which facilitates a master/slave interaction with a lead or trailing vehicle.

12 Claims, 6 Drawing Sheets

(56) References Cited

U.S. PATENT DOCUMENTS

| | | | |
|---|---|---|---|
| 2014/0365104 A1* | 12/2014 | Sasaki | B60W 30/18154 701/119 |
| 2015/0066350 A1* | 3/2015 | Iwata | G01C 21/3469 701/400 |
| 2016/0026187 A1* | 1/2016 | Alam | B60W 30/16 701/23 |
| 2016/0214606 A1* | 7/2016 | Roos | B60W 50/0097 |
| 2016/0267795 A1* | 9/2016 | Miyazawa | G08G 1/22 |
| 2016/0267796 A1* | 9/2016 | Hiroma | G08G 1/22 |

\* cited by examiner

AUTONOMOUS PULSE AND GLIDE SYSTEM

BACKGROUND

Pulse and glide describes a strategy to improve vehicle fuel economy. In a pulse and glide mode a vehicle first accelerates to a maximum target speed, for example, ten miles per hour over a local speed limit and then glides to a minimum target speed, for example five miles per hour under a local speed limit. The period when the vehicle is accelerating is called a pulse. The period when the vehicle is gliding is called glide. A pulse and glide strategy is appealing because it improves vehicle fuel economy. A need, however, exists to improve how a vehicle implements pulse and glide.

DETAILED DESCRIPTION

The present disclosure provides a host vehicle having a vehicle system and method to implement a pulse and glide mode to affect fuel savings in a traffic situation. A vehicle operator may select an average speed setpoint and a maximum target speed and minimum target speed. The aforementioned variables may also be selected in an automated fashion to optimize fuel efficiency. The pulse and glide mode involves use of a strategy control module, an autonomous-mode controller, a radar control module, a powertrain control module (which accelerates or glides the host vehicle); a steering control module (which maintains the host vehicle in its lane or changes lanes) and/or a braking module. The vehicle system includes a processing device that includes the strategy control module in communication with the autonomous vehicle module, radar control module and a powertrain control module. The radar control module detects the distance to a lead vehicle and communicates the distance information in the form of a first signal to the strategy control module. The strategy control module operates to instruct a pulse and glide mode that accounts for various traffic situations. The strategy control module may interrupt a pulse signal or interface with a steering control module to direct the host vehicle, through an interface with the autonomous-mode controller to move from a first lane to a second lane to pass the lead vehicle. An inter-vehicle communication module (IVCM in drawings) may also be provided that is configured to communicate with the lead vehicle to allow the lead vehicle to operate in a master mode and the host vehicle to operate in a slave mode.

In a first mode the host vehicle pulses toward a lead vehicle. The radar control module detects the lead vehicle and a signal is received by the strategy control module. The strategy control module can be configured to match the speed of the lead vehicle or interrupt a pulse mode and/or transition to a glide mode where the distance between the host vehicle and the lead vehicle increases. When the distance between the host vehicle and the lead vehicle reaches a maximum threshold as communicated by the radar control module, the strategy control module may signal another pulse so that the host vehicle accelerates toward the lead vehicle. When the minimum distance between the host vehicle and the lead vehicle is reached the strategy control module can once again initiate a glide signal. It is also possible that the host vehicle detects a trailing vehicle—i.e. another vehicle behind the host vehicle. Where the trailing vehicle speed is greater than the average speed of the host vehicle the host vehicle can increase its average speed or match the trailing vehicle speed to maintain a minimum distance from a trailing vehicle.

In a second pulse and glide mode, the host vehicle pulses toward the lead vehicle but the radar control module initiates a signal that indicates that the lead vehicle is traveling below a threshold speed. The radar control module then determines whether a second lane, or passing lane, is open so that the host vehicle may pass the lead vehicle. Where the host vehicle passes the lead vehicle the strategy control module may interface with the autonomous-mode controller and the steering controller to continue or if necessary extend a pulse to allow the host vehicle to pass the lead vehicle. The autonomous-mode controller and steering controller are configured to move the host vehicle into the second lane to pass the lead vehicle and upon passing the lead vehicle by a threshold distance to move the host vehicle back into the first lane.

In a third pulse and glide mode, the host vehicle detects that a passing lane is occupied by another autonomous vehicle. Detection of another autonomous vehicle is accomplished with an inter-vehicle communication module. In the third mode, the host vehicle determines, through the second mode, that the lead vehicle is travelling below the threshold speed. The host vehicle's inter-vehicle communication module is configured to communicate with the other autonomous vehicle and requests that the other autonomous vehicle clear the passing lane. The host vehicle may, through the inter-vehicle communication module, request that the other autonomous vehicle continue a pulse or move to a glide mode to clear the passing lane. When the host vehicle detects that the passing lane is clear the host vehicle will pass the lead vehicle in a manner described in the second pulse and glide mode.

The strategy control module also provides for pulse and glide convoy modes where a host vehicle detects another autonomous vehicle operating in a pulse and glide mode. In a pulse and glide convoy mode the host vehicle will operate in either of a slave mode or a master mode. The slave versus master mode need not be determined by whether the host vehicle is the trailing vehicle or the lead vehicle. Where the lead vehicle is the master vehicle the host vehicle will communicate with the lead vehicle through the inter-vehicle communication module. The lead vehicle can act as a master vehicle and transmit to the host vehicle the maximum target speed and minimum target speed. The host vehicle will modify its pulse and glide strategy to match the maximum and minimum target speeds of the lead/master vehicle. The radar control module may signal the strategy control module and/or the autonomous-mode controller to adjust the pulse, apply braking or adjust the glide to maintain a threshold distance between the lead vehicle and the host vehicle. It is also contemplated that the host vehicle as the trailing vehicle may operate as the master vehicle upon detecting a lead autonomous vehicle operating in a pulse and glide mode. Here, the lead vehicle would adopt the maximum and minimum target speeds from the host vehicle. In a pulse and glide convoy mode the host vehicle may pass the lead vehicle while maintaining the convoy mode or may switch from a master to a slave or vice versa.

The strategy control module, autonomous-mode controller, powertrain control module, steering control module, braking control module and inter-vehicle communication module are all incorporated through microprocessors and memory into a host vehicle system. The strategy control module and autonomous-mode controller include computer memory and processor. The memory may include a maximum target speed and a minimum target speed as well as other process variables. The powertrain control module is connected to the host vehicle throttle to affect acceleration, i.e. pulse, or glide of the host vehicle. The steering control module in communication with the autonomous-mode controller operates to steer the host vehicle in order to maintain the host vehicle in its existing lane or to move the host vehicle into a second lane, e.g. a passing lane. The braking control module is connected to a host vehicle braking system, such as an ABS braking system to apply a host vehicle braking system. The host vehicle radar control module interfaces with a radar unit on the host vehicle which may be any of a LIDAR, camera or other sensing system. The radar control module may detect other vehicles in front of the host vehicle (i.e., a lead vehicle) or vehicles to either side or behind the host vehicle.

Figure 1:
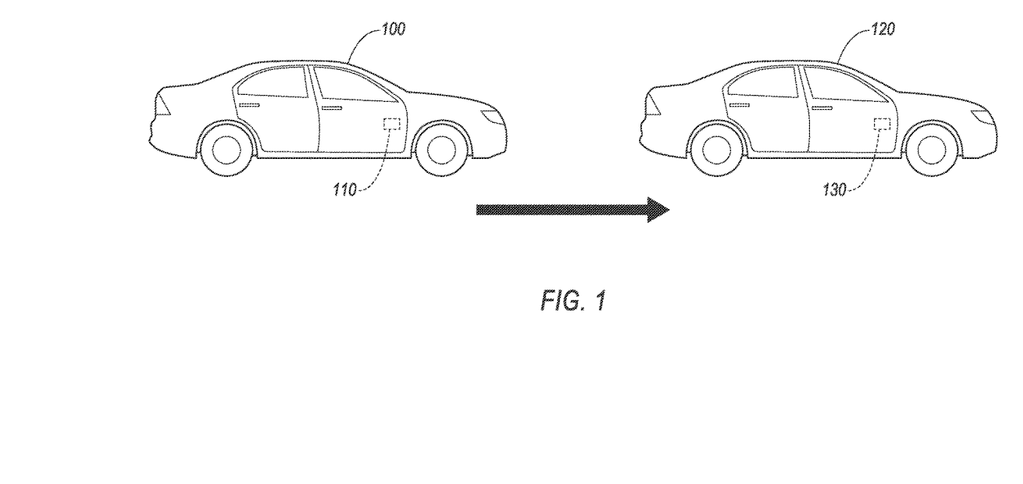
FIG. 1 illustrates an example host vehicle and lead vehicle configured to operate in a pulse and glide mode.

With reference to FIG. 1 there is shown a host vehicle 100 with a vehicle system 110. The host vehicle operates in a pulse and glide mode. In a pulse and glide mode an average speed setpoint is stored in memory. The average speed setpoint may correspond to the local speed limit. A pulse offset is also stored. The pulse offset is the difference between the average speed setpoint and the maximum target speed. An example of a pulse offset might be ten miles per hour over the local speed limit. A glide offset is also stored. The glide offset is the amount the host vehicle will slow down below the average speed setpoint when the vehicle is in a glide mode. For example, a glide offset may be five miles per hour below the local speed limit.

Also shown is a lead vehicle 120 having a lead vehicle system 130. When the host vehicle 100 operates in a pulse and glide mode and upon approaching the lead vehicle 120, the host vehicle 100 may detect a distance to the lead vehicle 120. If the lead vehicle is traveling above a minimum threshold speed the vehicle system 110 modifies the pulse and glide mode—for example, a pulse may be suspended. If the lead vehicle 120 is traveling below a minimum target speed the host vehicle 100 may pass lead vehicle 120. When passing the lead vehicle 120, the host vehicle system 110 determines whether a passing lane is open and if so an autonomous-mode controller associated with the vehicle system 110 can direct the host vehicle to pass the lead vehicle 120. The vehicle system 110 may also determine that the lead vehicle is operating in a pulse and glide mode. When vehicle system 110 determines that the lead vehicle 120 is operating in a pulse and glide mode the vehicle system may convoy with the lead vehicle 120 where either the host vehicle 110 or lead vehicle 120 operates as a master vehicle with the other vehicle operating as a slave vehicle. In a master/slave convoy mode the slave vehicle, whether it is the host vehicle 100 or the lead vehicle 120, will use the maximum speed and minimum speed of the master vehicle.

Figure 2:
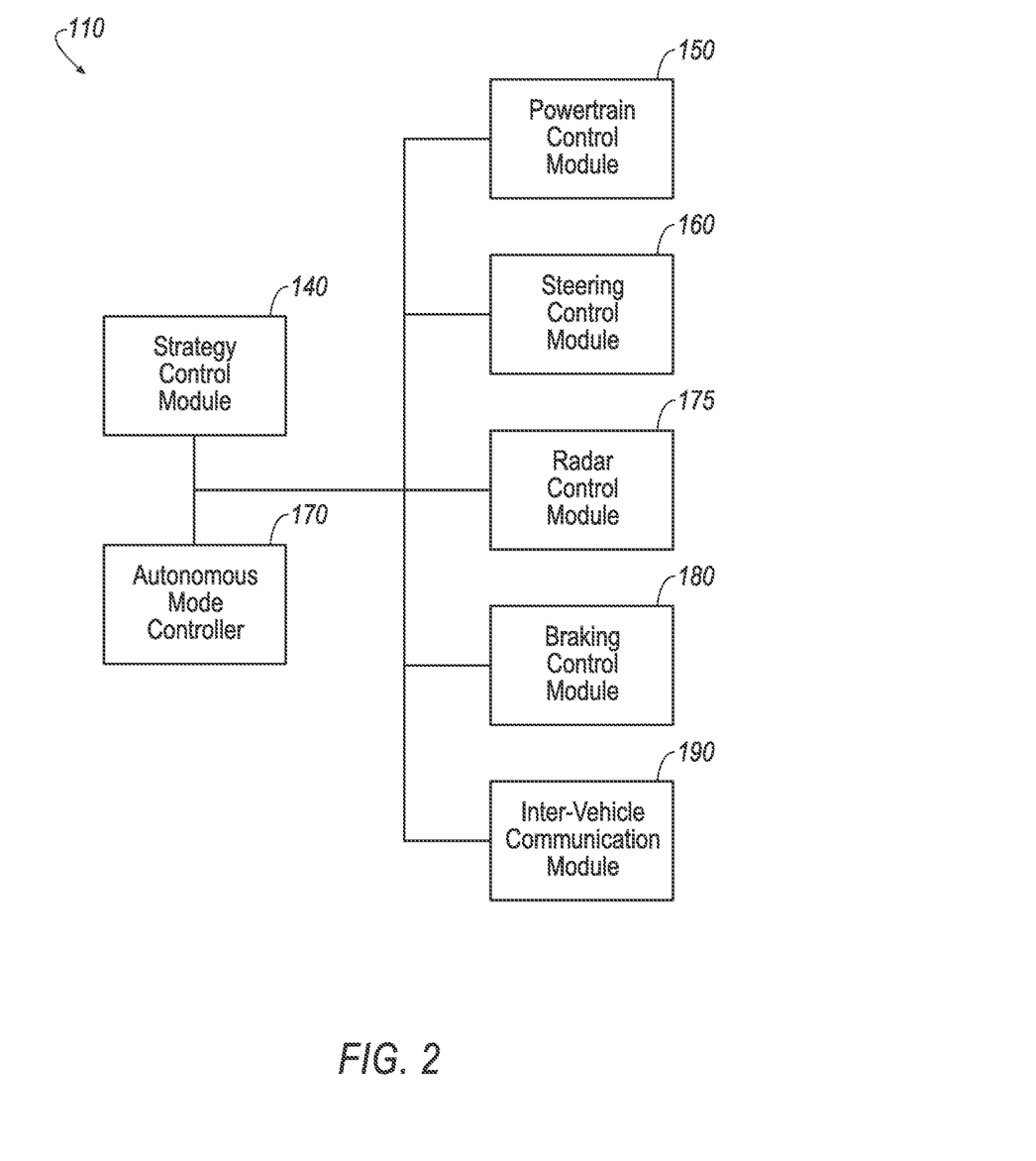
FIG. 2 is a block diagram of an example vehicle system that may be used with the host vehicle of FIG. 1 and alternately the lead vehicle of FIG. 1.

With reference to FIG. 2 the vehicle system 110 is shown in more detail. Vehicle system 110 includes a strategy control module 140. Strategy control module 140 includes a processor and memory. As shown, strategy control module 140 operates with an autonomous-mode controller 170. Autonomous-mode controller 170 operates host vehicle 100 in a fully autonomous or semi-autonomous mode. For purposes of this disclosure, an autonomous mode is defined as one in which each of the host vehicle 100 propulsion, braking, and steering are controlled by the autonomous-mode controller 170; in a semi-autonomous mode the autonomous-mode controller 170 controls one or two of the host vehicle 100 propulsion, braking, and steering. The autonomous-mode controller 170 operates with the strategy control module 140.

The vehicle system 110 includes a powertrain control module 150 which controls propulsion of the host vehicle 100. The powertrain control module 150 interfaces with the throttle function of the host vehicle to accelerate the host vehicle 100 in a pulse mode. Vehicle system also includes a steering control module which operates to turn the host vehicle 100 upon instruction from the autonomous-mode controller 170 and/or the strategy control module 140. The braking function of the host vehicle 100 is controlled by a braking control module 180. The braking control module 180 may include a controlled braking system such as ABS.

A radar control module 175 determines the distance to nearby objects to the host vehicle 100. Radar control module 175 may include a LIDAR system or other suitable proximity detectors. Radar control module 175 may determine the distance to a lead or a trailing vehicle or may operate to determine whether a right hand or left hand passing lane is clear. Vehicle system 110 includes an inter-vehicle communication module 190. Inter-vehicle communication module 190 communicates with other autonomous or semi-autonomous vehicles. Inter-vehicle communication module may operate through any of a variety of communication systems including cellular, Bluetooth, DSRC or communication protocols discussed in SAE J2735 or IEEE1609. Inter-vehicle communication module may initiate vehicle to vehicle communication to request another vehicle to clear a passing lane or to initiate a master/slave relationship.

Figure 3:
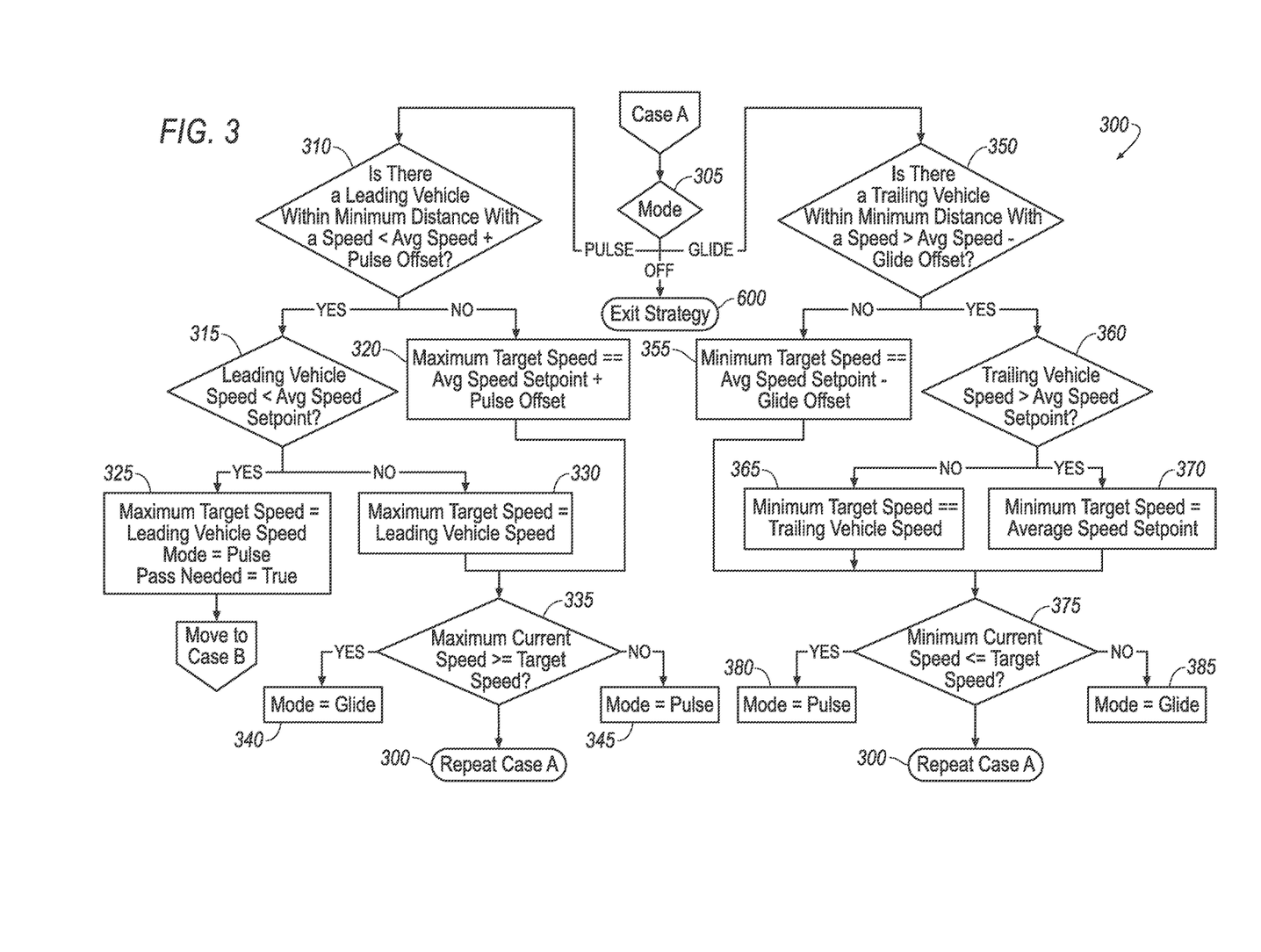
FIG. 3 is a flow chart of an example process that may be executed by one or more components of the vehicle system of FIG. 2.

With reference to FIG. 3 there is shown a flow chart for a first pulse and glide mode of operation. The first mode of pulse and glide begins at 300. Strategy control module 140 implements the first pulse and glide mode at 305 determining whether the host vehicle 100 is operating in a pulse mode or a glide mode or in a third alternate a vehicle operator has determined to exit a pulse and glide mode. In the event that a vehicle operator desires to exit the pulse and glide mode the strategy control module 140 exits at 600. If the host vehicle 100 is operating in a pulse mode, i.e. accelerating, the vehicle system 110 determines whether there is a lead vehicle 120 within a safe range, i.e. a minimum threshold distance at block 310. The strategy control module 140 may also gather information from the radar control module 175 to determine if the speed of the lead vehicle is greater than the maximum target speed.

Where there is no lead vehicle within the minimum threshold distance the host vehicle 100 maintains its maximum target speed as being the average speed setpoint plus the pulse offset speed as noted at block 320. Where the lead vehicle is within the minimum threshold distance, the radar control module 175 determines if the lead vehicle speed is less than the average speed setpoint at block 315. If the query response at block 315 is no, the maximum target speed is modified to be the lead vehicle speed at block 330. The strategy control module 140, as part of normal pulse and glide operation queries whether the current host vehicle speed, as detected by a speed sensor or global positioning, is greater than or equal to the maximum target speed at block 335.

Where the strategy control module recognizes that the lead vehicle speed is less than the average speed setpoint the strategy control module sets the maximum target speed to the speed of the of the lead vehicle. This can be overwritten in memory, or set in a register within the strategy control module. When the maximum target speed has been lowered the strategy control module is configured to execute a safe passing maneuver at 400.

Figure 4:
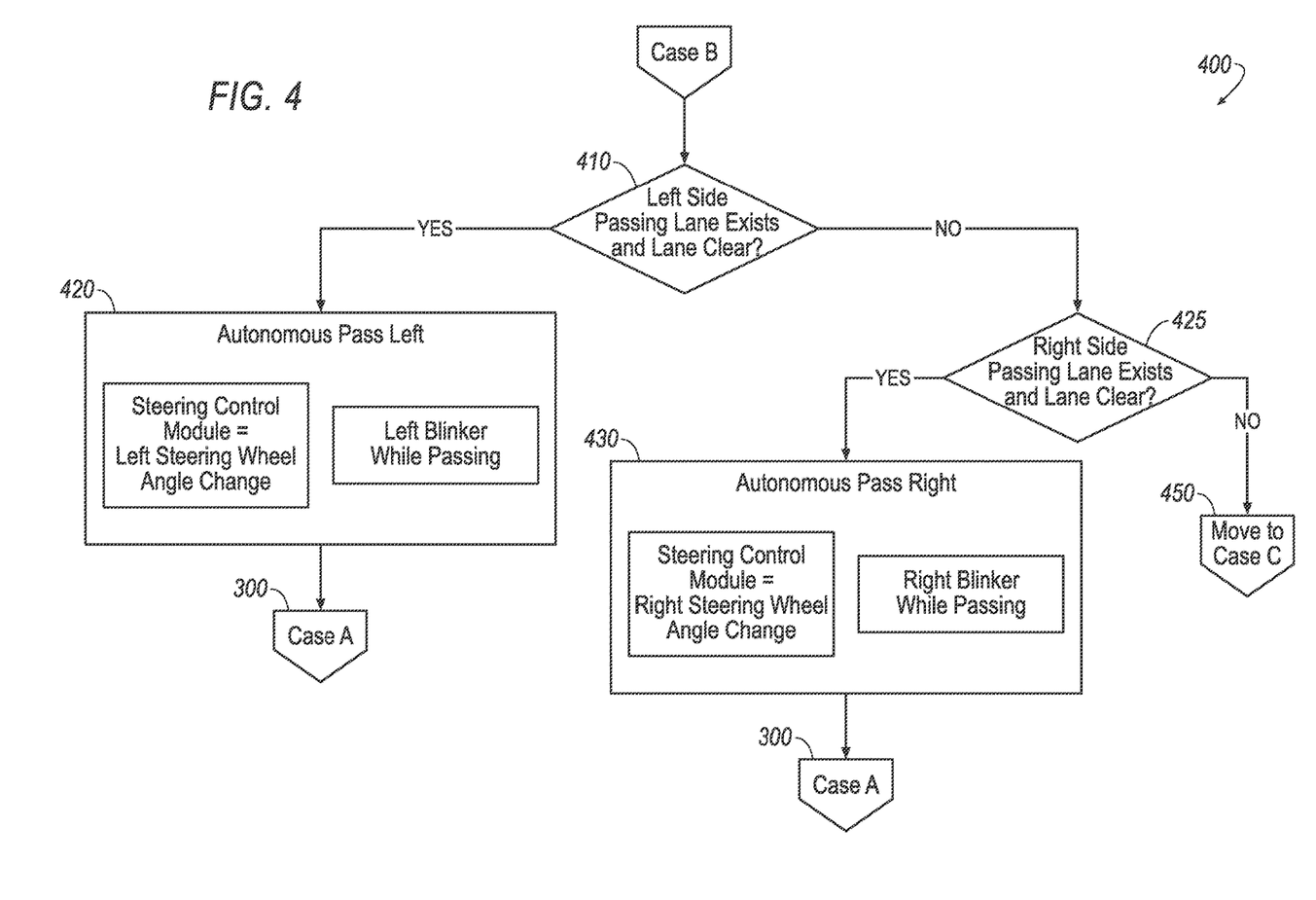
FIG. 4 is a flow chart of an example process that may be executed by one or more components of the vehicle system of FIG. 2.

A passing maneuver flow chart available to the strategy control module is shown in FIG. 4. While not noted in the flow chart of FIG. 4 it is understood that the vehicle operator may be prompted to confirm whether the host vehicle should execute a passing maneuver and the vehicle operator may reduce the average speed setpoint. As shown in FIG. 4 the host vehicle will preferably pass on the left by first querying the radar control module 175 whether the left lane is clear as noted at block 410. If the left lane is clear and as noted at block 420, the powertrain control module 150 will be signaled to increase throttle and accelerate the host vehicle to pass the lead vehicle in the left lane. Additionally, the steering control module 160 will receive instructions to turn the host vehicle 100 into the left lane to effect the pass of the lead vehicle. It is also possible to actuate a left turn signal where the host vehicle is passing on the left. After the host vehicle has passed the lead vehicle 120 the strategy control module returns to normal pulse and glide operation at 300.

With continuing reference to FIG. 4, if the left lane is not clear the strategy control module 140 determines if the right lane is clear at 425, also using signals from the radar control module 175. If the right lane is clear the and as noted at block 430, the powertrain control module will be signaled to increase throttle and accelerate the host vehicle to pass the lead vehicle in the right lane. Additionally, the steering control module 160 will receive instructions to turn the host vehicle into the right lane to effect the pass of the lead vehicle. It is also possible to actuate a right turn signal where the host vehicle is passing on the right. In the event that passing on the right is not allowed by the local laws, the passing on the right feature may be disabled. After the host vehicle has passed the lead vehicle 120 the strategy control module returns to normal pulse and glide operation at 300. Where both the right lane and the left lane are not clear the strategy control module may interface with the inter-vehicle communication module 190 to determine if a request can be made to a blocking vehicle to allow the host vehicle to execute a passing maneuver.

Figure 5:
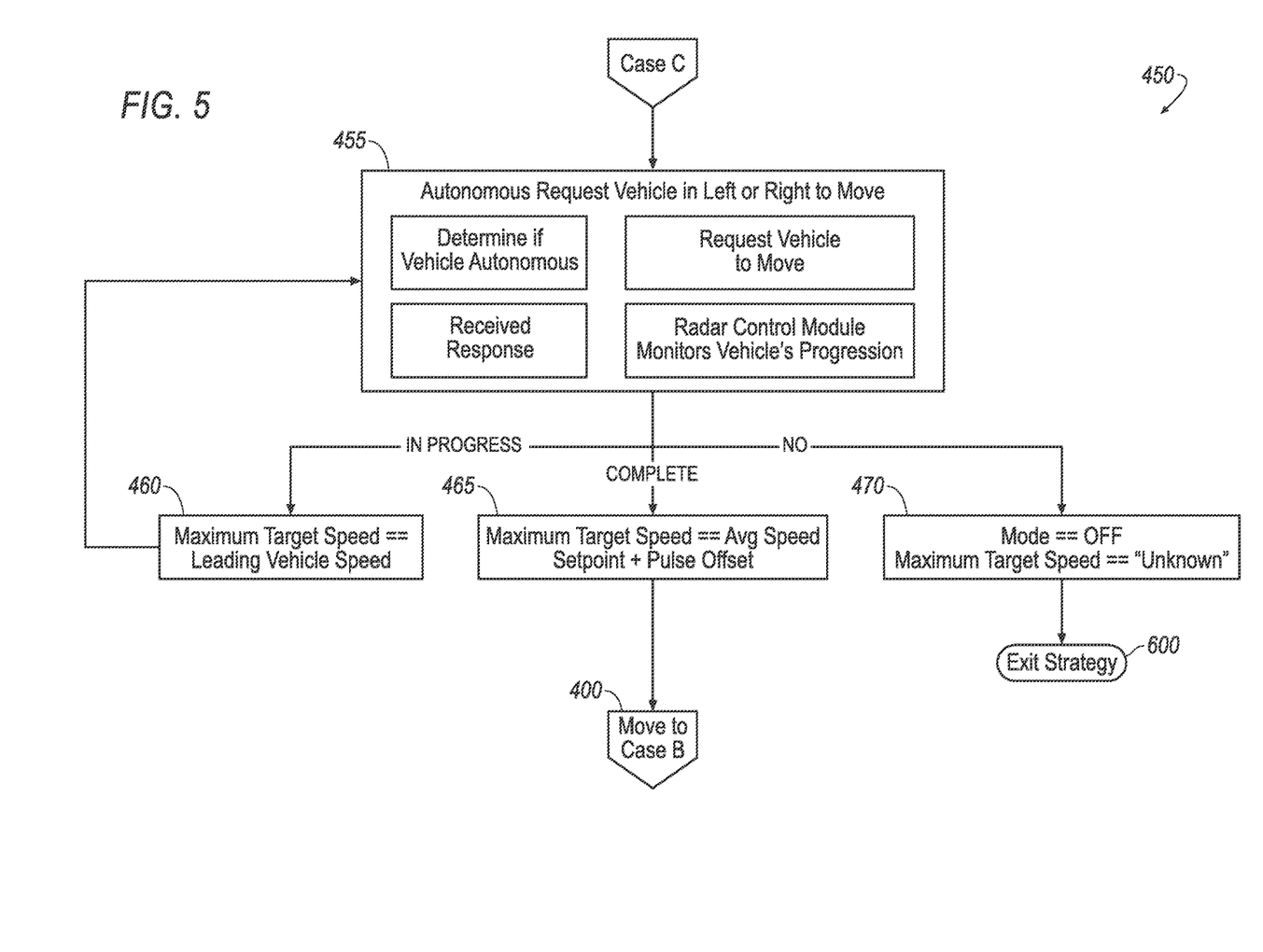
FIG. 5 is a flow chart of an example process that may be executed by one or more components of the vehicle system of FIG. 2.

With reference to FIG. 5, the host vehicle will make a request to vehicles in the right or left lanes to move to allow a passing maneuver to be executed. In the context of the current disclosure, the host vehicle 100 would attempt communication with vehicles in the left or right lanes with the inter-vehicle communication module 190 as noted at block 455. When a blocking vehicle is similarly equipped with an inter-vehicle communication module and autonomous-mode controller, the host vehicle may request that the blocking vehicle decrease its speed. While the host vehicle 100 waits for a passing lane to become available the maximum target speed is adjusted to match the lead vehicle speed at block 460. With reference again to block 455 when the blocking vehicle moves and a passing lane is available to pass the lead vehicle the strategy control module will increase the maximum target speed to be the average speed setpoint plus the pulse offset at block 465 and execute the passing maneuver at block 400. Where a passing lane does not become available and the lead vehicle speed is inconsistent it may be necessary to set the maximum target speed to an unknown value at block 470 and exit the pulse and glide strategy at block 600.

Returning to FIG. 3, it may be that the host vehicle 100 is in a glide mode as noted at block 305. If the host vehicle 100 is in a glide mode, i.e. the host vehicle is decelerating, the strategy control module 140 interfaces with the radar control module 175 to also determine if the host vehicle 100 is within a minimum safe range from a trailing vehicle. As noted in block 350 the evaluation of the speed of the trailing vehicle to determine if the speed of trailing vehicle is greater than the average speed setpoint minus the glide offset (with the average speed setpoint minus the glide offset being the minimum target speed, for example five miles per hour below the local speed limit). Where speed of the trailing vehicle is not too fast the minimum target speed can remain as the average speed setpoint minus the glide offset at block 355. Here, the host vehicle 100 will continue to operate in a standard pulse and glide mode as initiated at block 375. At block 375 the strategy control module 140 queries whether the host vehicle has reached the minimum target speed during the glide mode. If the host vehicle 100 has not yet reached the minimum target speed the glide mode continues at block 385. Once the minimum target speed is reached the strategy control module initiates a pulse at block 380 and the strategy control module returns to normal operation at block 300.

Figure 6:
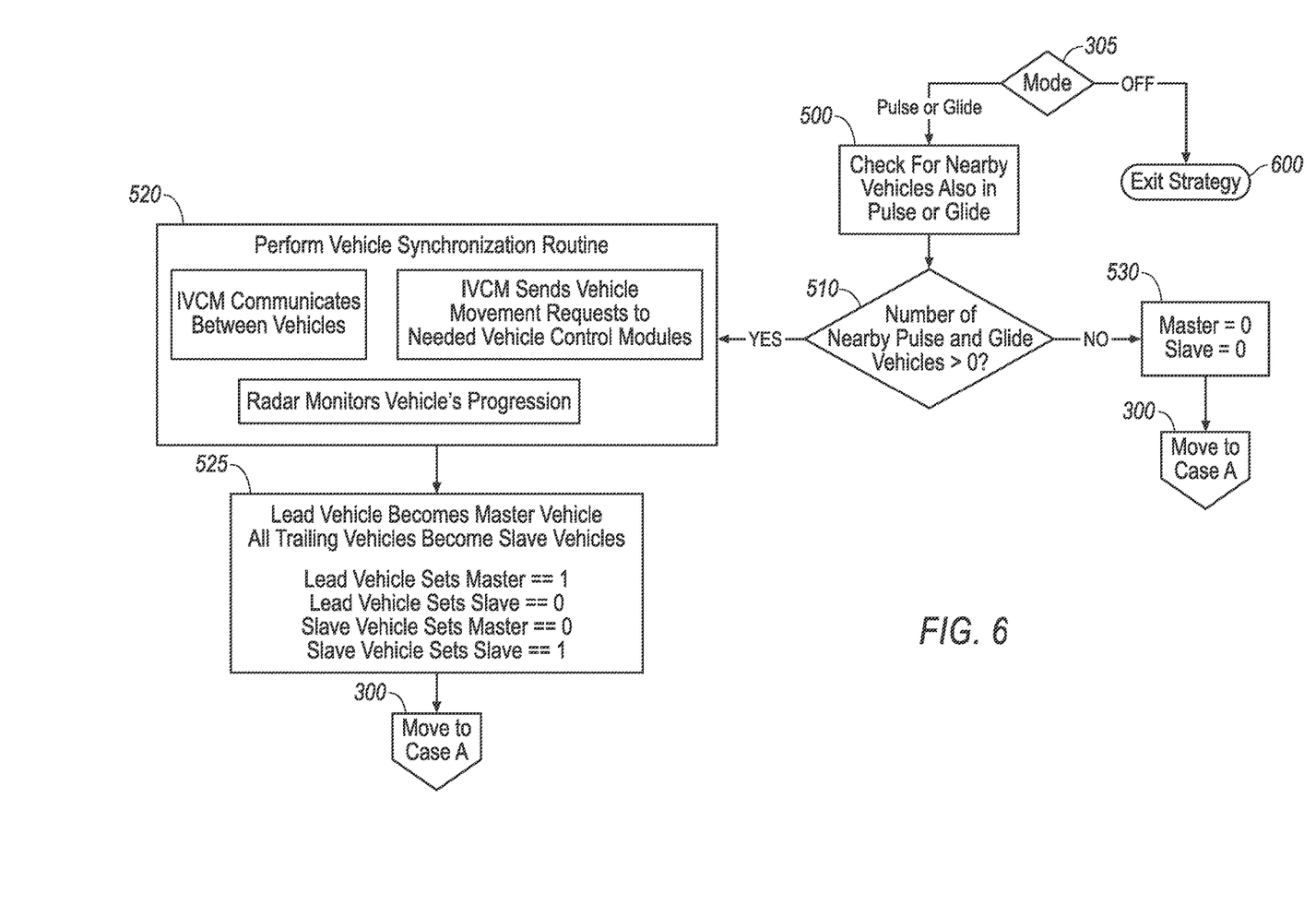
FIG. 6 is a flow chart of an example process that may be executed by one or more components of the vehicle system of FIG. 2.

With reference to FIG. 6 there is shown a flow chart for a process implemented by strategy control module 140 to determine if a convoy pulse and glide mode is available. At block 305 the strategy control module determines whether a pulse and glide mode is activated. If the pulse and glide mode is not active the process exits at block 600. If operating in a pulse and glide mode, the strategy control module 140 together with the inter-vehicle communication module 190 determines whether other nearby vehicles are operating in a pulse and glide mode as noted at block 500. If no other nearby vehicles are operating in a pulse and glide mode, as noted at block 510, the system continues with normal pulse and glide operation at blocks 530 and 300. Where there is at least one other vehicle operating in a pulse and glide mode the strategy control module 140 performs a vehicle synchronization routine at block 520.

With reference to block 520 the vehicle synchronization routine begins with inter vehicle communication as executed by inter-vehicle communication module 190. Operating under the assumption that the lead vehicle will be the master vehicle the lead vehicle will send its maximum target speed and minimum target speed to the host vehicle 100. In a master/slave arrangement the host vehicle 100 will follow the master vehicle using the radar control module to maintain a minimum threshold distance. As noted in block 520 the radar control module operates to communicate to the powertrain control module 150 and autonomous-mode controller 170 to reach the maximum or minimum target speeds. At block 525 a convoy of slave vehicles may be created by identifying additional trailing vehicles behind the host vehicle.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A host vehicle system comprising:
a strategy control module in communication with an autonomous-mode controller and a powertrain control module; and
a radar control module in communication with the autonomous-mode controller, the radar control module configured to send a first signal indicating a threshold distance to a lead vehicle;
wherein the strategy control module operates the host vehicle in a pulse and glide mode which is modified in response to the first signal
a steering control module in communication with the strategy control module; the steering control module receiving a signal to move from a first lane to a second lane in response to the first signal, and
an inter-vehicle communication module configured to communicate with the lead vehicle and the processing device configured to determine if the lead vehicle is operating in an autonomous mode wherein the inter-vehicle communication module signals the lead vehicle to slow down and wherein the steering control module receives a signal to move from the second lane into the first lane after the lead vehicle has been passed by a safe distance.

2. The system of claim 1 wherein the strategy control module interrupts a vehicle pulse with a glide in response to the first signal.

3. The system as in claim 2 wherein the radar control module is configured to send a second signal indicating a threshold over the minimum distance has been reached and the strategy control module generates a pulse signal.

4. The system as in claim 3 further comprising an inter-vehicle communication module configured to communicate with the lead vehicle.

5. The system as in claim 4 wherein the strategy control module modifies the pulse and glide mode to match a lead vehicle pulse and glide.

6. The system as in claim 1 wherein the strategy control module generates a glide signal.

7. A method of operating a host vehicle in an autonomous pulse and glide mode comprising:
communicating a first signal from a radar control module to a strategy control module and an autonomous-mode controller, the first signal corresponding to a threshold distance to a lead vehicle;
modifying the pulse and glide mode in response to the first signal
wherein the host vehicle communicates with the lead vehicle via an inter-vehicle communication module and the lead vehicle operates as a master and the host vehicle operates as a slave and wherein the strategy control module instructs the autonomous-mode controller to pass the lead vehicle by initially moving from a first lane to a second lane, via a steering control module in communication with the strategy control module, in response to the first signal; wherein the inter-vehicle communication module is configured to determine if the lead vehicle is operating in an autonomous mode and wherein the inter-vehicle communication module signals the lead vehicle to slow down and wherein the steering control module receives a signal to move from the second lane into the first lane after the lead vehicle has been passed by a safe distance.

8. A method as in claim 7 wherein the host vehicle communicates with a trailing vehicle via the inter-vehicle communication module and the trailing vehicle operates as a slave.

9. The method as in claim 7 wherein the inter-vehicle communication module signals a blocking vehicle to decrease speed prior to the autonomous-mode controller signaling a pass.

10. The method as in claim 7 where the host vehicle communicates with a trailing vehicle via an inter-vehicle communication module.

11. The method as in claim 10 wherein the host vehicle initiates a pulse.

12. The method as in claim 7 wherein the strategy control module interrupts a vehicle pulse.

* * * * *